(12) United States Patent
Kao et al.

(10) Patent No.: US 10,191,207 B2
(45) Date of Patent: Jan. 29, 2019

(54) LIGHT EMITTING MODULE AND ELECTRONIC DEVICE WITH THE SAME

(71) Applicant: ASUSTeK COMPUTER INC., Taipei (TW)

(72) Inventors: Ho-Jui Kao, Taipei (TW); Yu-Sheng Wang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/588,711

(22) Filed: May 8, 2017

(65) Prior Publication Data

US 2017/0329077 A1 Nov. 16, 2017

Related U.S. Application Data

(60) Provisional application No. 62/335,704, filed on May 13, 2016.

(30) Foreign Application Priority Data

Feb. 24, 2017 (TW) ............................. 106106467 A

(51) Int. Cl.
*G02B 6/00* (2006.01)
*F21V 8/00* (2006.01)

(52) U.S. Cl.
CPC ......... *G02B 6/0083* (2013.01); *G02B 6/0036* (2013.01); *G02B 6/0055* (2013.01); *G02B 6/0091* (2013.01); *G02B 6/0093* (2013.01)

(58) Field of Classification Search
CPC ..... G02B 6/0055; G02B 6/0083; G02B 6/0093
USPC ........................................................ 362/606
See application file for complete search history.

(56) References Cited

U.S. PATENT DOCUMENTS

| | | | |
|---|---|---|---|
| 9,817,168 B2 | 11/2017 | Kuo | |
| 2005/0001952 A1* | 1/2005 | Han | G02B 6/0018 349/65 |
| 2005/0276566 A1* | 12/2005 | Iimura | G02B 6/0018 385/146 |
| 2006/0109684 A1* | 5/2006 | Nesterenko | G02B 6/0018 362/610 |
| 2007/0223248 A1* | 9/2007 | Han | G02B 6/0025 362/612 |

(Continued)

FOREIGN PATENT DOCUMENTS

| CN | 205037132 U | 2/2016 |
|---|---|---|
| TW | I414835 B | 11/2013 |

(Continued)

*Primary Examiner* — Christopher Raabe
(74) *Attorney, Agent, or Firm* — CKC & Partners Co., Ltd.

(57) ABSTRACT

A light emitting module adapted to a mainboard is provided. The mainboard includes a side edge. The light emitting module comprises a circuit board and a light guide bar. The circuit board is detachably attached to the mainboard and adjacent to the side edge of the mainboard. A plurality of light emitting elements are disposed at the circuit board. The light guide bar is disposed at the circuit board, when the light emitting module is assembled to the mainboard, the light guide bar uniformly guides light from the light emitting elements. An electronic device including the light emitting device is also provided.

12 Claims, 3 Drawing Sheets

(56) References Cited

U.S. PATENT DOCUMENTS

2008/0180972 A1* 7/2008 Sakamoto .............. G02B 6/009
362/613
2010/0157200 A1* 6/2010 Mun .................... G02B 6/0038
349/65
2015/0285981 A1* 10/2015 Park .................... G02B 6/0025
349/64

FOREIGN PATENT DOCUMENTS

| TW | 201445435 A | 12/2014 |
|----|-------------|---------|
| TW | M499586 U | 4/2015 |
| TW | M50805353 U | 9/2015 |

* cited by examiner

LIGHT EMITTING MODULE AND ELECTRONIC DEVICE WITH THE SAME

CROSS-REFERENCE TO RELATED APPLICATION

This application claims the priority benefit of U.S. provisional application Ser. No. 62/335,704, filed on May 13, 2016 and TW application serial No. 106106467, filed on Feb. 24, 2017. The entirety of the above-mentioned patent applications are hereby incorporated by references herein and made a part of specification.

BACKGROUND OF THE INVENTION

Field of the Invention

The disclosure relates to a light emitting module and, more specifically, to a detachable light emitting module.

Description of the Related Art

With the development of technology, computer industry is rapidly developed. A conventional computer host is monotonous and boring in appearance. Therefore, mainboards with light effects are launched on the market. Moreover, transparent computer cases, such as acryl cases, are favorable by users to assemble a see-through host. Such computer hosts show mainboards with light effects inside the casing and reveal personal styles.

Furthermore, light strip(s) is applied to mount on the computer casing for decoration. A controller for the light strip(s) is directly built on the mainboard to save the interior space of the case. These applications provide more visual senses in computer systems and enhance user experiences.

BRIEF SUMMARY OF THE INVENTION

According to an aspect of the disclosure, a light emitting module adapted to a mainboard is provided. The mainboard includes a side edge. The light emitting module comprises a circuit board and a light guide bar. The circuit board is detachably attached to the mainboard and adjacent to the side edge of the mainboard. A plurality of light emitting elements are disposed at the circuit board. The light guide bar is disposed at the circuit board, when the light emitting module is assembled to the mainboard, the light guide bar uniformly guides light from the light emitting elements.

According to another aspect of the disclosure, an electronic device is provided. The electronic device comprises a mainboard, and a light emitting module. The mainboard includes a side edge. The light emitting module includes a circuit board, a light guide bar and a metal guard plate. The circuit board is detachably attached to the mainboard and adjacent to the side edge of the mainboard. A plurality of light emitting elements are disposed at the circuit board. The light guide bar is disposed at the circuit board, when the light emitting module is assembled to the mainboard, the light guide bar uniformly guides light from the light emitting elements. The circuit board and the light guide bar are disposed between the metal guard plate and the mainboard.

In embodiments, the interior space of the computer case is saved for mounting various essential components and would not be occupied by the light emitting module. The light emitting module is mounted to the mainboard and then installed to the computer case. Thus, the size of the computer case does not need to be changed. According to the disclosure, the diverse light color patterns and light effects are provided. Furthermore, the light effects can be changed according to the display information or requirements of the user.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used for limit the size or the proportion. For bettering understanding, a same/similar component in the following description is denoted by a same reference symbol.

Unless mentioned otherwise, the terms used throughout the specification and the claims usually refer to their general meanings in the art, in the disclosure except explained specially. Some terms used for describing the disclosure are discussed hereinafter or elsewhere in the specification to provide other understanding of the disclosure for the person having ordinary skills in the art.

The words "first", "second" and the like are not used for limiting a sequence or an order. These words are only used for distinguishing different elements or operations that have same technical names.

Additionally, the terms, such as "include", "comprise", "contain" and "have/has", are open-ended terms, which means "include but not limited to".

Figure 1:
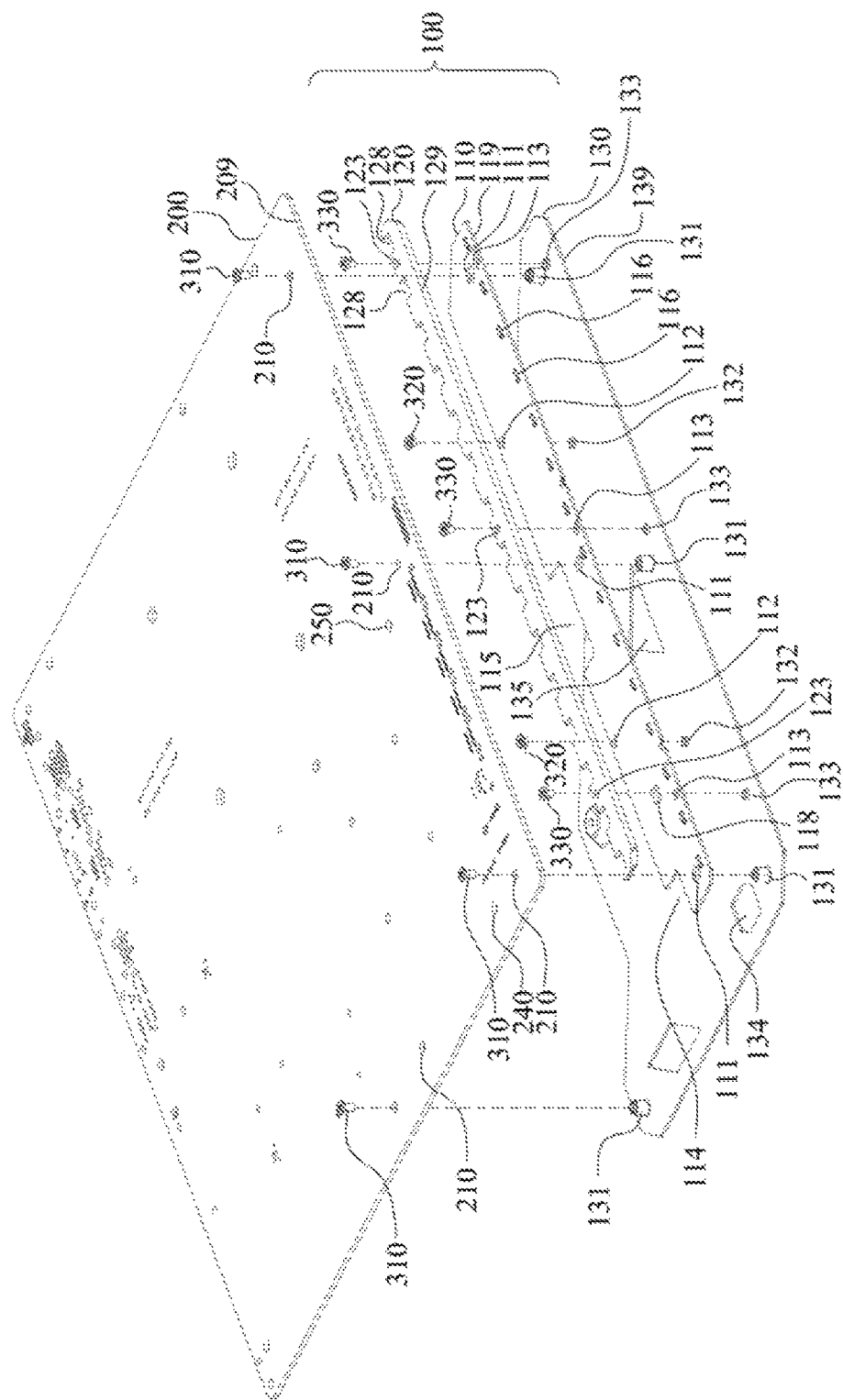
FIG. 1 is an exploded view of a light emitting module and a mainboard in an embodiment.

FIG. 1 is an exploded view of a light emitting module and a mainboard in an embodiment. As shown in FIG. 1, a light emitting module 100 includes a circuit board 110 and a light guide bar 120. A plurality of light emitting elements 116, such as light emitting diodes (LEDs), are disposed at the circuit board 110 and attached to the mainboard 200. The light guide bar 120 is adjacent to the circuit board 110. Thus, light emitted from the light emitting elements 116 uniformly transmit from a side edge of the mainboard 200.

In an embodiment, the light guide bar 120 is disposed between the circuit board 110 and the mainboard 200. Thus, the light of the light emitting elements 116 uniformly transmit from the side edge of the mainboard 200. In an embodiment, the light emitting elements 116 are LEDs.

In the embodiment, the light emitting module 100 further includes a metal guard plate 130. The metal guard plate 130 is fixed at an outer side of the mainboard 200. That is, the circuit board 110 and the light guide bar 120 are disposed between the metal guard plate 130 and the mainboard 200 to protect the circuit board 110 and the light guide bar 120.

Figure 2:
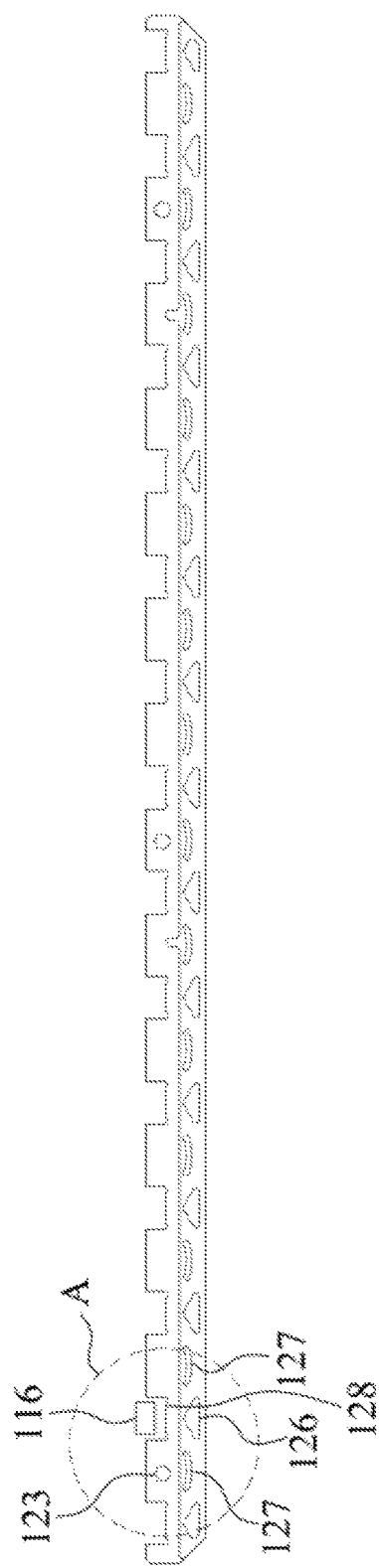
FIG. 2 is a schematic diagram showing a light guide bar in an embodiment.
Figure 3:
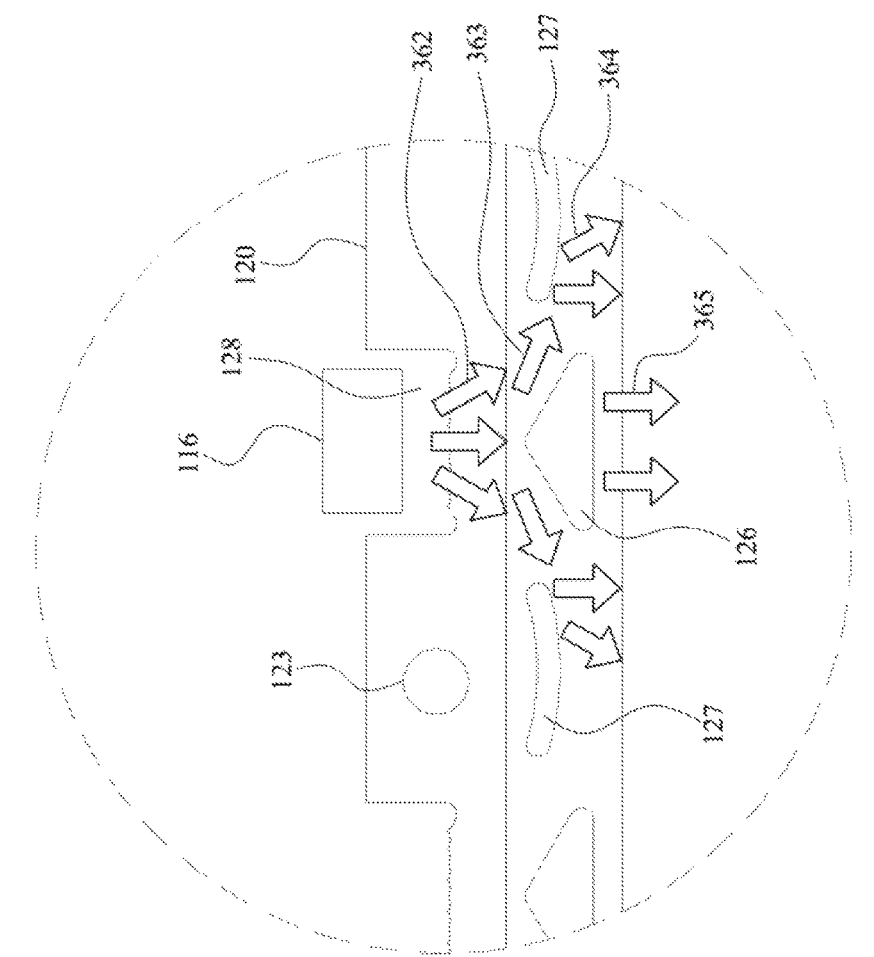
FIG. 3 is an enlarged view of partial of a light guide bar in an embodiment.

Please refer to FIG. 2 and FIG. 3. FIG. 2 is a schematic diagram showing a light guide bar in an embodiment. FIG.

3 is an enlarged view of partial of a light guide bar in an embodiment. As shown in FIG. 2 and FIG. 3, the light guide bar 120 includes a plurality of light emitting element receiving recesses 128, a plurality of first reflectors 126 and a plurality of second reflectors 127. The light emitting element receiving recess 128 is used for accommodating the light emitting element 116. Part of the light 362 from the light emitting elements 116 that indicated as light 363 in FIG. 3 is reflected by the first reflectors 126, such as triangular reflectors. Part of the light 362 from the light emitting element 116 that indicated as light 365 in FIG. 3 comes out through the first reflectors 126. The light 363 is then reflected by second reflectors 127, such as curved reflectors, and come out from the side edge of the mainboard 200.

With the configuration of the first reflectors 126 and the second reflectors 127, the light generated from the light emitting elements 116 uniformly transmits from a side surface below the mainboard 200. Thus, the light effect with various light colors is presented more uniformly.

In an embodiment, the metal guard plate 130 includes a metal guard plate end surface 139. The light guide bar 120 includes a light guide bar end surface 129. The mainboard 200 includes a mainboard end surface 209. The metal guard plate end surface 139, the light guide bar end surface 129 and the mainboard end surface 209 metal guard plate end surface are aligned with each other.

That is, the metal guard plate end surface 139 and the light guide bar end surface 129 are aligned with the mainboard end surface 209. The widths of the metal guard plate 130 and the light guide bar 120 do not exceed the width of the mainboard. Thus, with the light emitting module 100, the mainboard 200 does not need additional interior space of the case when they are installed inside a computer case. The computer host is kept at a regular dimension and configuration. In an embodiment, the circuit board end surface 119 of the circuit board 110 is retracted relative to the metal guard plate end surface 139, the light guide bar end surface 129 and the mainboard end surface 209. The light guide bar end surface 129 and the mainboard end surface 209 are aligned. In an embodiment, the circuit board end surface 119 is aligned with the metal guard plate end surface 139, the light guide bar end surface 129 and the mainboard end surface 209.

In an embodiment, the metal guard plate 130 includes mounting holes 134 and 135. In an embodiment, the mounting holes 134 and 135 are aligned with mainboard fixing holes 240 and 250 of the mainboard 200, respectively. The circuit board 110 includes mounting holes 114 and 115. The mounting holes 114 and 115 are aligned with the mainboard fixing holes 240 and 250 of the mainboard 200, respectively.

Additionally, the mounting holes 114 and 115 are also aligned with the mounting holes 134 and 135 of the metal guard plate 130, respectively. Thus, when the mainboard 200 is mounted to the computer case, the mainboard 200 is directly fixed to a fixing surface of the computer case. The mounting height of the mainboard 200 does not need to be adjusted even the mainboard 200 is provided with the light emitting module 100. The width and height of the light emitting module 100 does not exceed the width and height of the mainboard 200 respectively. Consequently, the light emitting module 100 can be configured below the mainboard 200 and located between the mainboard 200 and the computer case. Thus, no additional space is required for the light emitting module 100. As a result, as for the light emitting module 100 and the electronic device (such as a computer mainboard) including the light emitting module 100, the mainboard 200 and the computer case are provided with the light color patterns and the light effects while the computer host is kept at a regular dimension and configuration.

In an embodiment, the light emitting module 100 further includes a control chip 118. The control chip 118 is disposed on the circuit board 110 to control the light emitting elements 116 to change light colors and brightness. In an embodiment, the control chip 118 is controlled by the mainboard 200 to change the colors and the brightness of the light from the light emitting elements 116. The control chip 118 is disposed on the circuit board 110 of the light emitting module 100. The control chip 118 is configured between the mainboard 200 and the computer case. Thus, the space of the mainboard 200 would not be occupied by the control chip 118. The diverse light colors and patterns are thus provided while the computer host is kept at a regular dimension and configuration.

In an embodiment, an electronic device is also provided. The electronic device includes the mainboard 200 and the light emitting module 100. The light emitting module 100 includes the circuit board 110, the light guide bar 120 and the metal guard plate 130. The circuit board 110 is attached to the mainboard 200. A plurality of the light emitting elements 116 are disposed at the circuit board 110. The light guide bar 120 is disposed between the circuit board 110 and the mainboard 200. Thus, the light from the light emitting elements 116 uniformly transmit from the side edge of the mainboard 200. The circuit board 110 and the light guide bar 120 are disposed between the metal guard plate 130 and the mainboard 200.

The light guide bar 120 includes a plurality of the light emitting element receiving recesses 128, a plurality of the first reflector 126 and a plurality of the second reflector 127. Part of the light 362 from the light emitting elements 116 that indicated as light 363 is reflected by the first reflectors 126, such as triangular reflectors. Part of the light 362 that indicated as light 365 comes out through the first reflectors 126. The light 363 is then reflected by the second reflectors 127, such as curved reflectors, and comes out from the side edge of the mainboard 200.

In an embodiment, the electronic device further includes a first fixing device 310. The light emitting module 100 is fixed to the mainboard 200 via the first fixing device 310. A first opening 210 is formed at the mainboard 200. A first opening 111 is formed at the circuit board 110. A first fixing seat 131 is disposed at the metal guard plate 130. The first fixing device 310 passes through the first openings 210 and 111 to be fixed to the first fixing seat 131. Thus, the light emitting module 100 is fixed to the mainboard 200. In an embodiment, the first fixing device 310 is a bolt, and the first fixing seat 131 is a nut, which is not limited herein.

In an embodiment, the light emitting module 100 further includes a second fixing device 320. A second opening 112 is formed at the circuit board 110. A second fixing seat 132 is disposed at the metal guard plate 130. The circuit board 110 is fixed to the metal guard plate 130 via the second fixing device 320 and the second fixing seat 132. In an embodiment, the second fixing device 320 is a bolt and the second fixing seat 132 is a nut, which is not limited herein.

In an embodiment, the light emitting module 100 further includes a third fixing device 330. A third opening 123 is formed at the light guide bar 120. A third opening 113 is formed at the circuit board 110. A third fixing seat 133 is disposed at the metal guard plate 130. The light guide bar 120 is fixed to the metal guard plate 130 via the third fixing device 330 and the third fixing seat 133. In an embodiment, the third fixing device 330 is a bolt and the third fixing seat 133 is a nut, which is not limited herein.

In an embodiment, in assembly, the circuit board 110 and the light guide bar 120 are fixed to the metal guard plate 130 first. Then, the metal guard plate 130 is fixed to the mainboard 200. The light emitting module 100 is easily assembled.

In embodiments, the interior space of the computer case for mounting various components would not be occupied by the light emitting module. The light emitting module is mounted to the mainboard and then installed to the computer case. Thus, the size of the computer case does not need to be changed. Diverse light color patterns and light effects are provided. The light effects can be changed according to the display content or requirements of the user.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A light emitting module, adapted to a mainboard including a side edge, the light emitting module comprising:
    a circuit board, detachably attaching to the mainboard and adjacent to the side edge of the mainboard;
    a plurality of light emitting elements, disposed at the circuit board; and
    a light guide bar, disposed at the circuit board, when the light emitting module is assembled to the mainboard, the light guide bar uniformly guides light from the light emitting elements, wherein the light guide bar includes a light guide bar end surface, the mainboard includes a mainboard end surface, and the light guide bar end surface is aligned with the mainboard end surface to allow the light from the light emitting elements uniformly transmitting outwardly from the side edge of the mainboard.

2. The light emitting module according to claim 1, wherein the light emitting module further includes a metal guard plate, and the circuit board and the light guide bar are disposed between the metal guard plate and the mainboard.

3. The light emitting module according to claim 2, wherein the light guide bar includes a plurality of light emitting element receiving recesses, a plurality of first reflectors, and a plurality of second reflectors.

4. The light emitting module according to claim 3, wherein the first reflectors are triangle reflectors, and part of the light from the light emitting elements is reflected to the second reflectors by the first reflectors.

5. The light emitting module according to claim 4, wherein the second reflectors are curved reflectors, and the light reflected by the first reflectors is reflected by the second reflectors.

6. The light emitting module according to claim 5, wherein the metal guard plate includes a metal guard plate end surface, and the metal guard plate end surface and the light guide bar end surface are aligned with the mainboard end surface.

7. The light emitting module according to claim 6, wherein the metal guard plate includes a plurality of mounting holes that are aligned with a plurality of mainboard fixing holes of the mainboard, respectively.

8. The light emitting module according to claim 7, wherein the circuit board includes a plurality of mounting holes that are aligned with the mainboard fixing holes of the mainboard and the mounting holes of the metal guard plate, respectively.

9. The light emitting module according to claim 2, wherein the circuit board further includes a control chip.

10. An electronic device comprising:
    a mainboard including a side edge; and
    a light emitting module, including:
    a circuit board, detachably attaching to the mainboard and adjacent to the side edge of the mainboard;
    a plurality of light emitting elements, disposed at the circuit board;
    a light guide bar disposed at the circuit board, when the light emitting module is assembled to the mainboard, the light guide bar uniformly guides light from the light emitting elements; and
    a metal guard plate, the circuit board and the light guide bar are disposed between the metal guard plate and the mainboard, wherein the metal guard plate includes a metal guard plate end surface, the light guide bar includes a light guide bar end surface, the mainboard includes a mainboard end surface, and the metal guard plate end surface and the light guide bar end surface are aligned with the mainboard end surface to allow the light from the light emitting elements uniformly transmitting outwardly from the side edge of the mainboard.

11. The electronic device according to claim 10, wherein the light guide bar includes a plurality of light emitting element receiving recesses, a plurality of first reflectors and a plurality of second reflectors, the first reflectors are triangle reflectors, and part of the light from the light emitting elements is reflected to the second reflectors by the first reflectors.

12. The electronic device according to claim 11, wherein the circuit board further includes a control chip.

* * * * *